(12) United States Patent
Sainomoto et al.

(10) Patent No.: US 7,586,916 B2
(45) Date of Patent: *Sep. 8, 2009

(54) PACKET ROUTING APPARATUS AND METHOD OF EFFICIENTLY ROUTING PACKETS AMONG NETWORK EQUIPMENT

(75) Inventors: Yoshitaka Sainomoto, Sagamihara (JP); Hidemitsu Higuchi, Ebina (JP); Naoya Ikeda, Yokohama (JP); Shigeki Yoshino, Hadano (JP); Yukihide Inagaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 566 days.

This patent is subject to a terminal disclaimer.

(21) Appl. No.: 11/413,021

(22) Filed: Apr. 28, 2006

(65) Prior Publication Data

US 2006/0209835 A1    Sep. 21, 2006

Related U.S. Application Data

(63) Continuation of application No. 10/093,527, filed on Mar. 11, 2002, now Pat. No. 7,068,656.

(30) Foreign Application Priority Data

Mar. 19, 2001  (JP) ............................. 2001-077607

(51) Int. Cl.
*H04L 12/28* (2006.01)
(52) U.S. Cl. .................................................. 370/392
(58) Field of Classification Search ................. 370/351, 370/389, 392, 393, 400–402
See application file for complete search history.

(56) References Cited

U.S. PATENT DOCUMENTS

| | | | | |
|---|---|---|---|---|
| 5,434,863 A | 7/1995 | Onishi et al. | ................ | 370/402 |
| 5,463,621 A | 10/1995 | Suzuki et al. | ................ | 370/399 |
| 5,490,252 A | 2/1996 | Macera et al. | .............. | 709/249 |
| 5,566,170 A * | 10/1996 | Bakke et al. | ................. | 370/392 |
| 5,822,319 A | 10/1998 | Nagami et al. | .............. | 370/392 |
| 5,978,844 A * | 11/1999 | Tsuchiya et al. | ............ | 709/221 |
| 5,982,296 A | 11/1999 | Wakasa et al. | .............. | 370/392 |
| 6,016,350 A * | 1/2000 | Funabe et al. | ................ | 713/153 |
| 6,112,248 A | 8/2000 | Maciel et al. | ................ | 709/238 |

(Continued)

FOREIGN PATENT DOCUMENTS

JP        5199230        8/1993

OTHER PUBLICATIONS

Kent, et al "Network Working Group, Request for Comments": 2401, Nov. 1998, Security Protocol Architecture for the Internet Protocol.

*Primary Examiner*—Dmitry Levitan
(74) *Attorney, Agent, or Firm*—Brundidge & Stanger, P.C.

(57) ABSTRACT

A routing apparatus includes a plurality of routing units and function units. The routing unit receives a packet from each port, and uses header information contained in the packet to judge whether the packet should be transmitted to the function unit. In the case where the packet should be transmitted to the function unit, the routing unit adds a first identifier to the packet and transmits it to a transmission unit. The function unit receives the packet containing the first identifier from the transmission unit, and executes a predetermined processing for the packet. The function unit adds a second identifier to the packet and transmits it to the transmission unit.

13 Claims, 15 Drawing Sheets

U.S. PATENT DOCUMENTS

| | | | |
|---|---|---|---|
| 6,122,285 A | 9/2000 | Okada | 370/450 |
| 6,130,894 A * | 10/2000 | Ojard et al. | 370/421 |
| 6,173,333 B1 * | 1/2001 | Jolitz et al. | 709/240 |
| 6,385,657 B1 | 5/2002 | Parady | 370/223 |
| 6,496,510 B1 | 12/2002 | Tsukakoshi et al. | 370/401 |
| 6,604,147 B1 | 8/2003 | Woo | 709/240 |
| 6,611,522 B1 | 8/2003 | Zheng et al. | 370/395.21 |
| 6,704,794 B1 | 3/2004 | Kejriwal et al. | 709/236 |
| 6,708,218 B1 * | 3/2004 | Ellington et al. | 709/236 |
| 6,724,769 B1 | 4/2004 | Sang | 370/429 |
| 6,771,662 B1 * | 8/2004 | Miki et al. | 370/469 |
| 6,804,234 B1 * | 10/2004 | Chow | 370/389 |
| 2002/0083344 A1 | 6/2002 | Vairavan | 709/223 |

\* cited by examiner

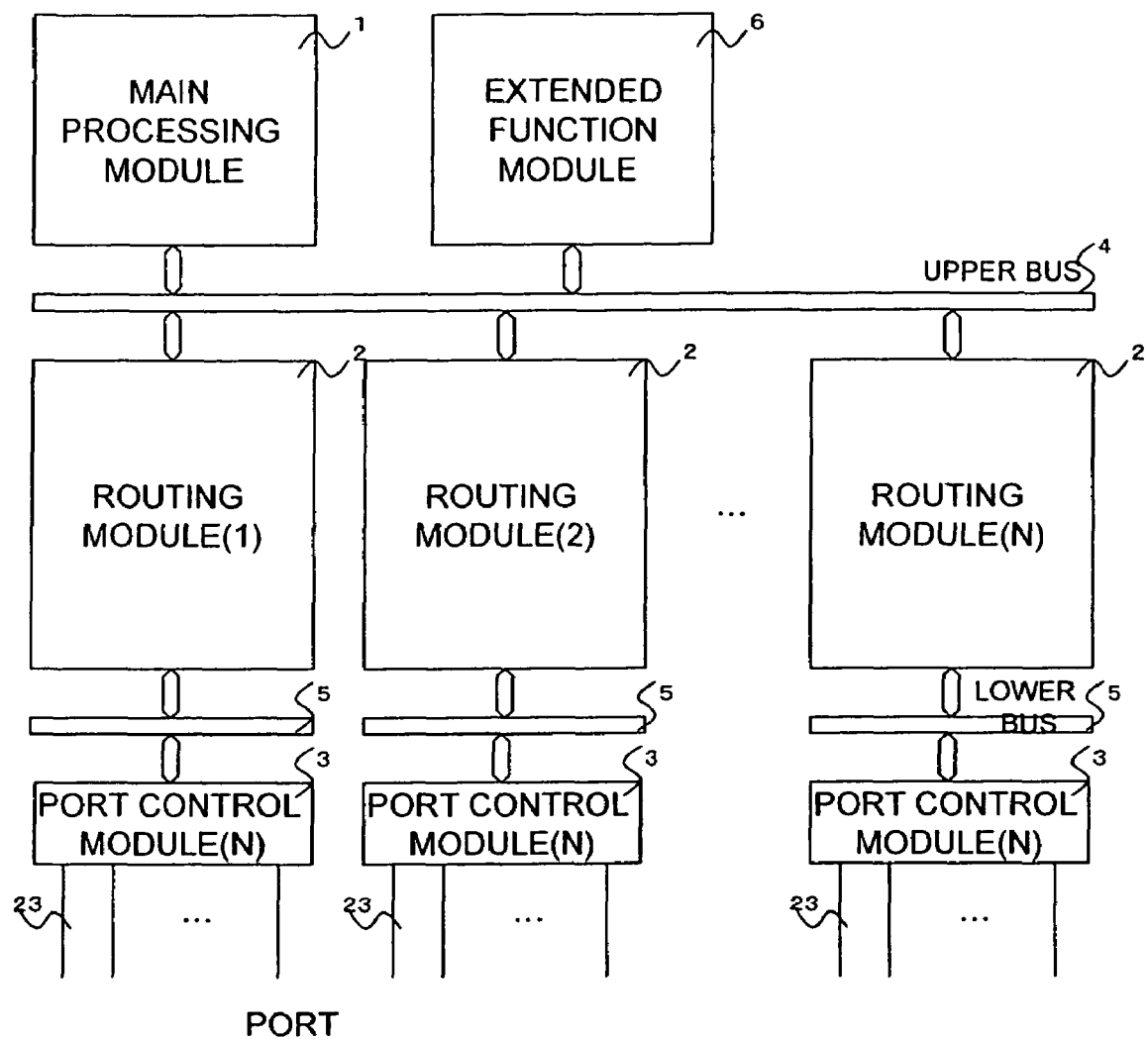
F I G. 1

| DESTINATION IP ADDRESS | SUBNET MASK | MODULE NUMBER | PORT NUMBER | NEXT NODE IP ADDRESS |
|---|---|---|---|---|
| 10.10.10.10 | 255.255.255.0 | 2 | 1 | 12.12.12.12 |
| 11.11.11.11 | 255.255.0.0 | 3 | 1 | 13.13.13.13 |
|  |  |  |  |  |
| .... | .... | .... | .... | .... |

| 401 | 402 |
|---|---|
| PORT NUMBER | PHYSICAL PORT NUMBER |
| 1 | 1 |
| 2 | 2 |
| 3 | 2 |
| .... | .... |

16

F I G. 5

| DETECTING CONDITION | MODULE NUMBER | PORT NUMBER | NEXT NODE IP ADDRESS |
|---|---|---|---|
| DESTINATION IP ADDRESS = 10.10.10.10 | 5 | 1 | 14.14.14.14 |
| TRANSMISSION SOURCE IP ADDRESS = 11.11.11.11 | 5 | 1 | 14.14.14.14 |
| TCP PORT NUMBER = 1000 | 5 | 1 | 14.14.14.14 |
| .... | .... | .... | .... |

301 302 303 304 — 22

F I G. 6

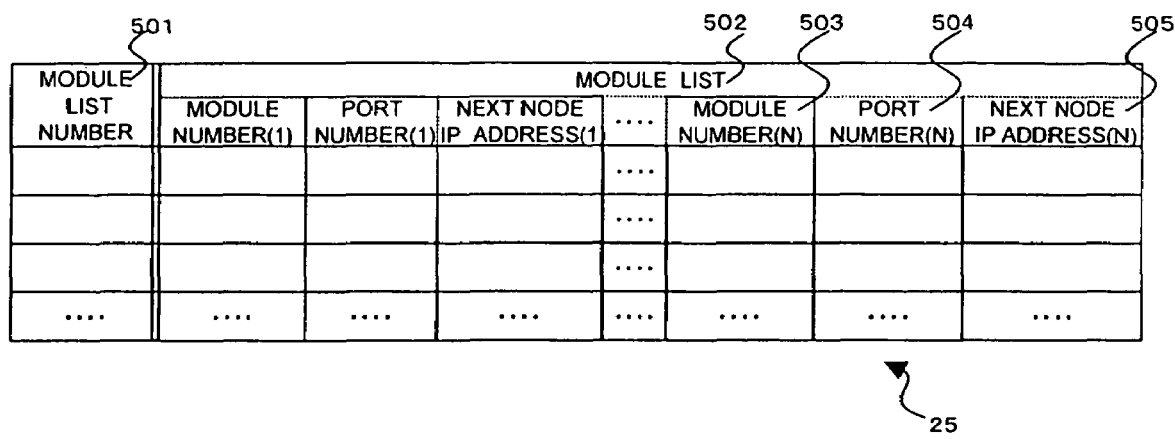
F I G. 14

| DETECTING CONDITION | MODULE NUMBER (MODULE LIST NUMBER) |
|---|---|
| DESTINATION IP ADDRESS = 10.10.10.10 | 1 |
| TRANSMISSION SOURCE IP ADDRESS = 11.11.11.11 | 2 |
| TCP PORT NUMBER = 1000 | 5 |
| .... | .... |

F I G. 1 5

PACKET ROUTING APPARATUS AND METHOD OF EFFICIENTLY ROUTING PACKETS AMONG NETWORK EQUIPMENT

The present application is a continuation of application Ser. No. 10/093,527, filed Mar. 11, 2002, now U.S. Pat. No. 7,068,656, the contents of which are incorporated herein by reference.

CROSS-REFERENCE TO RELATED APPLICATIONS

The present application is related to "INTERNETWORKING APPARATUS FOR CONNECTING PLURAL NETWORK SYSTEMS AND COMMUNICATION NETWORK SYSTEM COMPOSED OF PLURAL NETWORK SYSTEMS MUTUALLY CONNECTED", by K. Onishi et al, Ser. No. 09/935,919, filed Aug. 27, 1992, now U.S. Pat. No. 5,434,863; "A PACKET ROUTING APPARATUS" by S. Yoshino et al, Ser. No. 10/093,525, filed Mar. 11, 2002 claiming priority on Japanese patent application No. 2001-077585; "NETWORK CONNECTION APPARATUS", by Y. Inagaki et al, Ser. No. 10/093,526, filed Mar. 11, 2002 claiming priority on Japanese patent application No. 2001-067954, the contents of which are each incorporated herein by reference.

BACKGROUND OF THE INVENTION

The present invention relates to a packet routing apparatus and a routing method, and particularly to a packet routing apparatus and a routing method, which is effectively applied to a network connection equipment such as a router, a LAN switch or the like.

As an apparatus for connecting a plurality of networks, there is a packet routing apparatus for mutually connecting a plurality of networks in a network layer indicated by an Open System Interconnection (OSI) reference model. The packet routing apparatus selects a transmission route of a packet in accordance with an address for internetworking in the received packet and a routing table stored in the packet routing apparatus, and performs a routing processing of the packet. As a typical address for the internetworking, there is an IP address in accordance with an Internet Protocol (IP). The IP is often used for network construction in recent years.

Hereinafter, a general operation of routing of a data packet in accordance with the IP (hereinafter referred to as an IP packet) in the packet routing apparatus will be described.

The packet routing apparatus once stores an IP packet received from a certain communication port into a packet buffer memory. The packet routing apparatus includes a processing portion for performing route lookup of the IP packet. The processing portion performs lookup in a routing table by using a destination IP address set forth at a head of the IP packet as a lookup key. As a result of the lookup, a transmission destination network coincident with the destination IP address of the packet is obtained. The transmission destination network specifically includes an IP address (a next node IP address) indicating a packet routing apparatus for performing a routing processing of the packet next to the present packet routing apparatus, and an identifier (port number) of a communication port connected to the packet routing apparatus. The packet is transmitted in accordance with these pieces of information.

Here, as the amount of IP packet communication is remarkably increased in recent years, the packet routing apparatus for performing the routing processing of the IP packet is required to perform the routing processing of the IP packet at very high speed. As a technique for performing the routing processing of the IP packet at high speed, there is a technique disclosed in Japanese Patent Unexamined Publication No. 199230/1993 (U.S. Pat. No. 5,434,863). According to this, the packet routing apparatus includes a main processor and a plurality of routing accelerators. The main processor mainly performs apparatus management of the whole packet routing apparatus, such as route information management. The plurality of routing accelerators assist the main processor and dedicatedly perform the routing processing of packets. The main processor and the routing accelerators, and the respective routing accelerators are connected through a high speed router bus. The routing processing of packets are independently and dispersedly performed by the plurality of routing accelerators. The IP packet is subjected to the routing processing by the respective routing accelerators, and a packet in accordance with another protocol is transmitted to the main processor and its routing processing is performed.

That is, the routing accelerator is provided with a mechanism specialized for the routing processing of the IP packet, in order to perform especially the routing processing of the IP packet at high speed, and differentiates the IP packet from another packet and performs the routing processing at high speed. On the other hand, the packet other than the IP packet is transmitted to the main processor and is processed there. By the above technique, the packet routing apparatus can perform the routing processing of the IP packet at high speed.

As described above, while it is required to improve the routing performance of the IP packet to achieve high speed, various new additional functions have emerged in the IP network in addition to existing functions. For example, there is an IPsec function (set forth in Request for Comment (RFC) 2401) of encrypting a packet in an IP layer, for construction of Virtual Private Network (VPN), a Network Address Translator (NAT) function (set forth in RFC1631, RFC2391 and RFC2663) of mutually converting a private IP address and a global IP address, for private network construction, a server load balancing function of seamlessly using a plurality of servers by making the plurality of servers typified by one IP address for a client, an illegal packet detection, and a filtering function (set forth in RFC2267), or the like.

In these additional functions, a processing quite different from a normal routing processing of the IP packet must be carried out, for example, modification of an IP address, encryption/decryption of a data portion in the IP packet, comparison with a detailed table for detection of an illegal packet, or the like.

In the following description, various functions such as the foregoing Internet Protocol Security (IPsec) function, NAT function, load balance function, and illegal packet detection function are generally expressed by IP additional functions. Besides, a processing in relation to the IP additional function is expressed by an IP additional function processing.

In order to realize the IP additional function to the IP packet as described above, in addition to the normal IP packet routing processing, the IP additional function processing peculiar to the IP additional function must be performed for the IP packet. The IP additional function is complicated, and the processing is varied according to the function. Thus, in the foregoing packet routing apparatus, in order to perform the IP additional function processing for the IP packet, the IP packet is treated in the same manner as the packet other than the IP packet, and it must be transmitted to the main processor. The IP additional function processing and the routing processing are performed for these IP packets by software operating on the main processor.

However, in this method, although the IP packet is required to be subjected to the routing processing at high speed, it is transmitted to the main processor and is routed by the software processing. Thus, there is a technical problem that as compared with the routing processing by the routing accelerator, the throughput is lowered.

Originally, the main processor performs the apparatus management processing of the router itself, generation of all route information in the packet routing apparatus, change processing, and routing processing of the packet other than the IP packet. If the IP additional function processing, and the routing processing of the IP packet as the object of the IP additional function are performed by the main processor, there is a technical problem that a memory area, which ought to be used for storage of route information etc., is pressed, and a load is applied to the routing processing of the packet other than the IP packet.

SUMMARY OF THE INVENTION

An object of the present invention is to provide a packet routing apparatus and a routing method, which includes means for routing an IP packet at high speed equivalent to the speed of a case where only a normal routing processing is carried out, even in a case where an IP additional function processing is performed. Besides, another object of the present invention is to provide a packet routing apparatus and a routing method, which performs an IP additional function without applying a load to a main processor.

In the present invention, an IP packet is transmitted to an extended function module by the same procedure as a routing processing of the IP packet. By this, a bottleneck due to transmission of the IP packet to the extended function module can be avoided. The packet routing apparatus of the present invention can transmit the IP packet to the extended function module at high speed equivalent to the speed of the normal routing processing, and can perform an IP additional function processing for the IP packet at high speed. Besides, in the present invention, the IP packet is subjected to the routing processing by the same process as the foregoing, so that lowering of the routing performance of the IP packet can be prevented.

In the packet routing apparatus of the present invention, the load of one IP additional function can be distributed and processed by a plurality of extended function modules. By this, the processing performance of the IP additional function can be improved in proportion to the number of extended function modules mounted in the information routing apparatus.

The packet routing apparatus of the present invention can be provided with extended function modules for respectively processing plural kinds of IP additional functions, and they can be interconnected with each other. By this, it becomes possible to flexibly combine the plural kinds of functions in the packet routing apparatus. Besides, in the packet routing apparatus of the present invention, even if one or more extended function modules go wrong, the processing can be continued by a normal extended function module. By this, the reliability of the packet routing apparatus is improved.

The packet routing apparatus of the present invention includes an extended function module for dedicatedly executing an IP additional function processing and a structure for changing a route of an IP packet. By this, the packet routing apparatus transmits the IP packet as the object of the IP additional function to the extended function module at high speed, and the IP additional function is processed by the extended function module at high speed.

Hereinafter, the invention will be more specifically described.

For example, consideration will be given to a packet routing apparatus constituted by a main processing module and one or plural routing modules. The main processing module and the routing module, or the respective routing modules are connected by an upper bus. The main processing module has an apparatus management function of the whole packet routing apparatus, a function of generation and change of route information, and a routing processing function of a packet other than an IP packet, which can not be subjected to the routing processing by the routing module. The main processing module distributes the route information or its part to the respective routing modules. The respective routing modules perform the routing processing of the IP packet on the basis of the distributed route information.

One or plural port control modules are connected to the routing module through a lower bus. The port control modules control various ports, for example, Ethernet (Ethernet is a registered trademark by Fuji Xerox Co., Ltd.) port as well as Integrated Service Digital Network (ISDN) port and Asynchronized Transfer Mode (ATM) port, and transmit and receive packets to and from the respective ports.

The routing module is constituted by an IP packet route table lookup unit, a routing table, a port management table lookup unit, a port management table, an IP packet selecting unit, a packet buffer, a Central Processing Unit (CPU), a memory, an upper bus transceiver, and a lower bus transceiver. When a packet is received from the port control module, the lower bus transceiver recognizes the reception of the packet and stores the packet into the packet buffer. The IP packet selecting unit judges whether or not the received packet is the IP packet. In the case where the received packet is the IP packet, the IP route table lookup unit refers to an IP address of the packet, and uses it as a lookup key to perform lookup in the routing table. As a result of this lookup, transmission route information of the IP packet is obtained. The upper bus transceiver transmits the IP packet to the transmission side routing module through the upper bus in accordance with the transmission route information.

In the case where the IP packet selecting unit judges that the received packet is the packet other than the IP packet, the IP packet selecting unit stores the packet into the memory managed by the CPU. The CPU transmits the packet to the main processing module. The main processing module performs a processing suitable for the packet, and if the packet is needed to be routed, the main processing module transmits it to the routing module of the transmission side through the upper bus.

In the routing module at the transmission side, the upper bus transceiver recognizes the packet reception and stores the packet into the packet buffer. The port management table lookup unit performs lookup in the port management table on the basis of the transmission route information obtained in the routing module at the reception side. A port and a port number are made to correspond to each other and are held in the port management table. The port management table lookup unit obtains the port number from the port management table. The lower bus transceiver instructs the port control module for controlling the port indicated by the port number to transmit the packet. The instructed port control module extracts the packet from the packet buffer and transmits the packet to the port.

The information routing apparatus having the above structure further includes one or plural extended function modules connected to the upper bus. Besides, the IP route table lookup unit of the routing module includes a packet detecting unit and a routing information modifying unit.

The extended function module includes an extended function processing module for performing an arbitrary IP additional function. The extended function processing module performs a processing of an additional function for an IP packet. The extended function processing module may be constituted by, for example, a CPU, a memory, and software executed by the CPU, or may be constituted by an LSI (Large Scale Integration) for dedicatedly processing the IP additional function.

The packet detecting unit of the IP route table lookup unit performs lookup in the detection condition table in which transmission information to the extended function module is registered, by using the IP address of the packet or the protocol information of an IP layer or higher as a lookup key. As a result, the packet detecting unit identifies whether or not the packet should be transmitted to the extended function module, and the transmission information including the module number of the extended function module. The routing information modifying unit modifies the route information, which is obtained through the lookup performed by the IP route table lookup unit, by information indicating the transmission information module identified by the packet detecting unit. Alternatively, the transmission information is added as second route information to the route information.

In the case where the plurality of extended function modules are provided, the packet routing apparatus includes a load balancing control unit in addition to the above structure. The load balancing control unit selects, as a transmission destination of a packet, a piece of transmission route information from a list for storing transmission route information indicating extended function modules by a method as described below. The selecting method includes, for example, a method by round robin, a method of correlation with reception and transmission ports, a method of correlation with an IP address, a method of correlation with a TOS field, a method of correlation with a flow, a method by hash calculation, a method of counting a transmission data amount, and the like.

Besides, the packet routing apparatus includes a failure monitoring unit in addition to the above structure. The failure monitoring unit monitors the operation state of the extended function module at a constant period. When judging through the monitoring that some extended function module fails, the failure monitoring unit deletes the information indicating the extended function module from the list of the transmission route information. When judging that the extended function module is restored from the failure, the failure monitoring unit again adds the information indicating the extended function module to the list.

BREIF DESCRIPTION OF THE DRAWINGS

FIG. 1 is a structural view showing the outline of a packet routing apparatus of an embodiment.

FIG. 5 is a view showing a structural example of a port management table.

FIG. 6 is a view showing a structural example of a detecting condition table.

FIG. 14 is a view showing a structural example of an extended function processing module list.

FIG. 15 is a view showing another structural example of a detecting condition table.

DETAILED DESCRIPTION OF THE EMBODIMENTS

Figure 2:
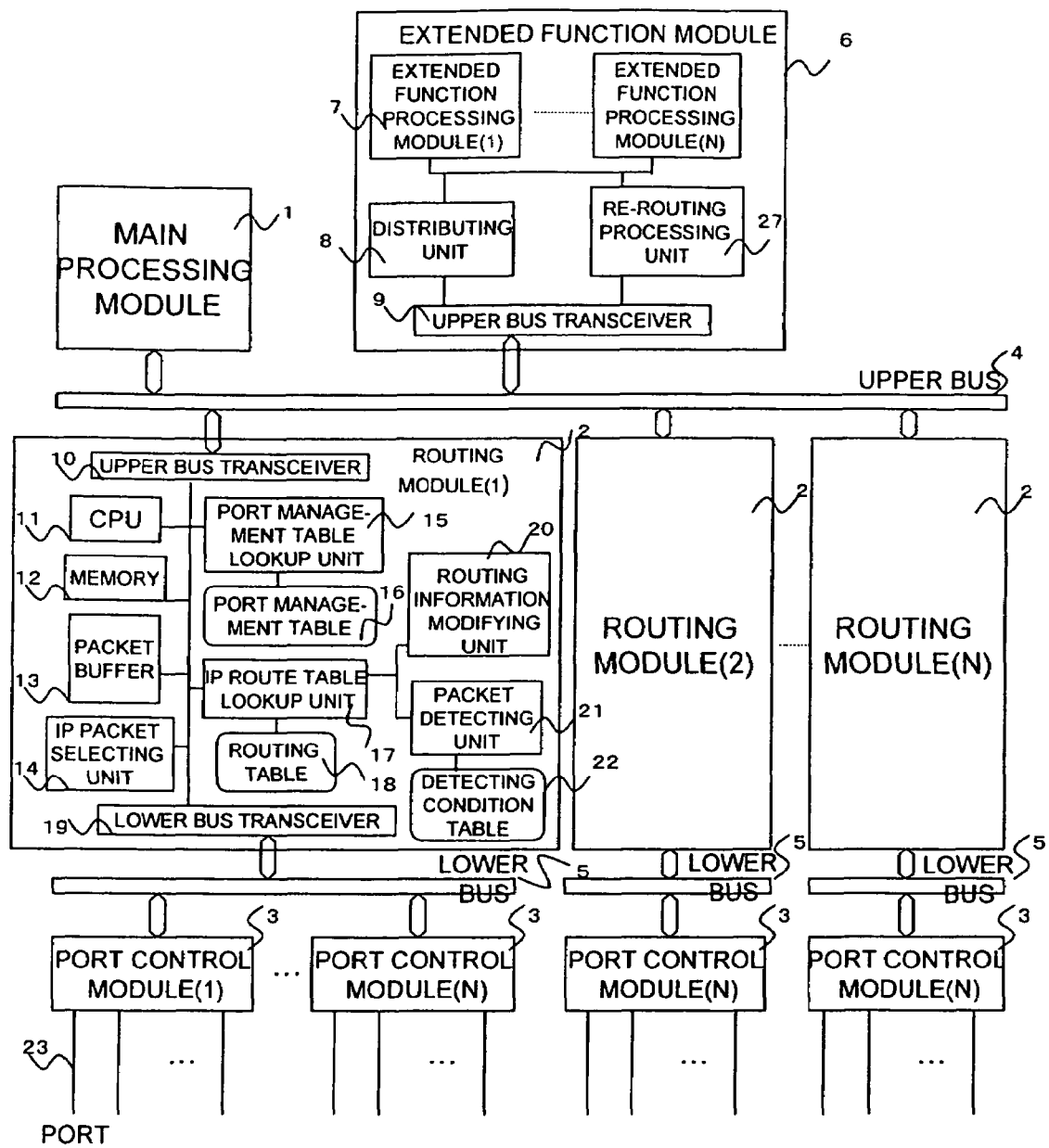
FIG. 2 is a structural view showing the details of the packet routing apparatus of the embodiment.

Hereinafter, embodiments of the present invention will be described in detail with reference to the drawings.

FIG. 1 shows the outline of a structural example of a packet routing apparatus. In the following explanation, first, respective units constituting the packet routing apparatus are described, and then, a processing procedure of a packet is described using a flowchart.

First, the structure of the packet routing apparatus is described. The packet routing apparatus is provided with a main processing module 1, an extended function module 6, and one or plural routing modules 2. The respective modules are connected to each other through a high speed upper bus 4. Further, each of the routing modules 2 is connected to a plurality of port control modules 3 through a lower bus 5. The port control module 3 controls various ports 23, for example, an Ethernet port as well as an ISDN port, an ATM port, and the like, and transmits and receives packets to and from the ports 23.

The upper bus 4 may be replaced by anything other than a bus as long as it is a high speed coupling mechanism. For example, this coupling mechanism may be a crossbar switch having a switching structure. The lower bus 5 is an interface for transmitting packet data and other information between the routing module 2 and the port control module 3.

A unique number is assigned to each of the modules in the packet routing apparatus. This number is written as a module number. Besides, numbers which do not overlap with each other in each of the routing modules are assigned to the ports 23 connected to each of the routing modules 2 through the port control module 3. This number is written as a physical port number. A logical port number used only in the inside of the apparatus may be made to correspond to the physical port number. It is not necessary that this logical port number and the physical port number are brought into one-to-one correspondence. For example, in the case of the ATM port, a plurality of VCs (Virtual Connections) can be set for one ATM port. Hereinafter, this logical port number is merely written as a port number. Besides, in the subsequent explanation, the routing module 2 connected to the port 23 which has received the packet is written as a reception side routing module, on the other hand, the routing module 2 connected to the port 23 which transmits the packet is written as a transmission side routing module.

The flow of a packet in the packet routing apparatus in the case where an IP additional function is executed for the received packet, will be described with reference to FIG. 1.

It is assumed that the packet is received from an arbitrary port 23 contained in the routing module (1)2. The packet received in the port 23 is transmitted to the routing module (1)2 through the port control module 3 and the lower bus 5. The routing module (1)2 recognizes from various lookup conditions, such as the destination of the packet or other protocol information etc. (for example, a TCP port number, a UDP port number, a next protocol number of IP, a destination IP address, a transmission destination IP address, etc.), that it is necessary to perform the IP additional function processing for the packet. The routing module (1)2 transmits the packet to the extended function module 6, not the routing module 2 (for example, the routing module (2)2) which contains the port of the transmission destination obtained by the lookup of the routing table from the destination of the packet. The extended function module 6 performs an arbitrary IP additional function processing for the packet, and transmits the packet to the routing module (2)2 containing the port 23 to which the packet is originally transmitted. As stated above, in the routing apparatus, when the packet is transmitted from the reception side routing module 2 to the transmission side routing module 2, the extended function module 6 is interposed in the middle of the transmission route, so that the arbitrary extended function processing can be performed for the packet.

FIG. 2 shows the details of the structural example of the packet routing apparatus. The respective portions will be described in detail with reference to this drawing.

The main processing module 1 is constituted by hardware, such as a CPU and a memory, and software executed by those devices. The main processing module 1 has an apparatus management function of the whole packet routing apparatus, a user interface function of performing various settings, and a generation and changing function of route information for packet routing. The main processing module 1 also performs the routing processing of a packet other than the IP packet, which can not be subjected to the routing processing by the routing module 2. The main processing module 1 distributes all or part of the generated route information to the respective routing modules 2. The respective routing modules 2 perform the routing processing of the packet by referring to the distributed route information.

The routing module 2 includes an upper bus transceiver 10, a CPU 11, a memory 12, a packet buffer 13, an IP packet selecting unit 14, a port management table lookup unit 15, a port management table 16, an IP packet route lookup unit 17, an IP routing table 18, a lower bus transceiver 19, a routing information modifying unit 20, a packet detecting unit 21, and a detecting condition table 22. The lower bus transceiver 19 handles the packet to be transmitted and received via the lower bus 5. The lower bus transceiver 19 performs a processing of storing the packet received from the lower bus 5 into the packet buffer 13. At that time, the lower bus transceiver 19 adds an identifier to a head portion of the packet. The identifier is used for transferring the routing information relating to the packet in transmission between the respective modules in the packet routing apparatus.

Figures 3, 4:
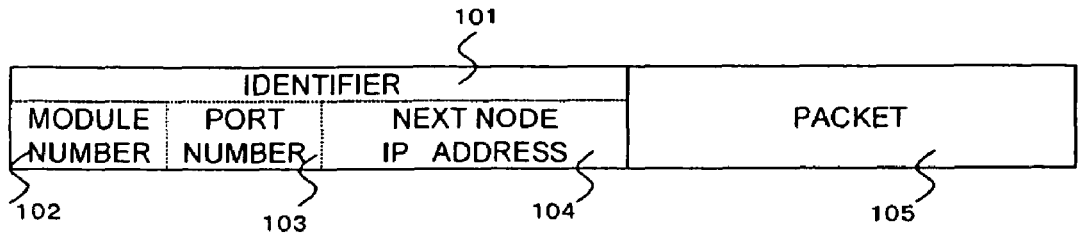
FIG. 3 shows an example of an identifier insertion format to a packet.
FIG. 4 is a view showing a structural example of a routing table.

FIG. 3 shows an example of an identifier insertion format to a packet. An identifier 101 to a packet 105 includes, as an example, a module number 102, a port number 103, and a next node IP address 104, which are transmission route information. A module number, a port number, and a next node IP address obtained as a result of lookup in an after-mentioned routing table are stored in respective fields of the module number 102, the port number 103, and the next node IP address 104 of the identifier 101. The transmission side routing module 2 refers to this identifier 101, and performs a transmission processing to the corresponding port 23.

Incidentally, although the term "identifier" is used in this embodiment, the term "header" or "label" may be used. Also, the format of the identifier is not limited to that shown in FIG. 3.

FIG. 4 shows a structural example of the routing table. The routing table 18 has a plurality of entries. As shown in the drawing, a module number 203, a port number 204, and a next node IP address 205, which are the transmission route information of the IP packet, a destination IP address 201, and a subnet mask 202 are made to correspond to one another and are stored in the respective entries.

The module number 203 is the number of the transmission side routing module 2 for containing the port 23 directly or indirectly connected to a network for transmitting the IP packet. The port number 204 is the number of the port 23 directly or indirectly connected to the network for transmitting the IP packet. The next node IP address 205 is the IP address indicating a packet routing apparatus for routing the IP packet next to this packet routing apparatus.

The IP packet route lookup unit 17 performs lookup in the routing table 18. In this lookup, the IP packet route lookup unit 17 uses the subnet mask 202 stored in one entry of the routing table 18, and extracts a network address portion from the destination IP address 201 of the entry. Besides, the IP packet route lookup unit 17 uses the subnet mask 202 and extracts a network address portion from the destination IP address contained in the IP header of the IP packet stored in the packet buffer 13. The IP packet route lookup unit 17 compares values of the two extracted network address portions with each other and judges whether both are coincident with each other. This judgment is performed for the respective entries of the routing table 18 until it is judged that the values of the two network address portions are coincident with each other. When the values of the two network address portions coincide with each other, the IP packet route lookup unit 17 reads out the transmission route information (the module number 203, the port number 204, and the next node IP address 205) stored in the entry.

FIG. 5 shows a structural example of the port management table. The port management table 16 includes a plurality of entries, and as shown in the drawing, a port number 401 and a physical port number 402 are made to correspond to each other and are stored in the respective entries.

When receiving the packet from the upper bus 4, the port management table lookup unit 15 uses as a key the port number 103 included in the identifier 101 added to the packet and performs lookup in the port number 401 of the port management table 16. When finding the entry in which the port number 401 coincident with the lookup key is registered, the port management table lookup unit 15 obtains from the entry the physical port number 402 of the port to which the packet is to be transmitted.

FIG. 6 shows a structural example of the detecting condition table. Conditions for detection of the IP packet as an object for which an IP additional function processing is performed, are stored in the detecting condition table 22. The detecting condition table 22 has a plurality of entries, and as shown in the drawing, a detecting condition 301 for detection of the IP packet for which the IP additional function processing is to be performed, a module number 302 of the extended function module 6 for executing the IP additional function processing, a port number 303, and a next node IP address 304 are made to correspond to one another and are stored in the respective entries. The detecting condition 301 is, for example, a destination IP address or a transmission source IP address. Besides, the detecting condition 301 may be protocol information higher than the IP layer, for example, a port number etc. of TCP (Transmission Control Protocol), UDP (User Datagram Protocol). Incidentally, in order to specify the extended function module 6, only the module number 302 may be used. When the port number 303 and the next node IP address 304 are used, even in the case where a plurality of extended function processing modules 7(1) to 7(N) are provided in the packet routing apparatus, the packet can be distributed to the respective modules.

The packet detecting unit 21 performs lookup in the detecting condition 301 of the detecting condition table 22 by the IP address included in the IP packet stored in the packet buffer 13 or the information of protocol of a further upper layer. In the case where the information contained in the packet and one of the detecting conditions 301 coincide with each other, the packet detecting unit 21 identifies the IP packet as the packet for which the IP additional function processing is to be performed, and obtains the module number 302 of the extended function module 6 for performing the processing, the port number 303, and the next node IP address 304 from the entry in which the coincidental detecting condition 301 is stored.

In the case where the IP packet for which the IP additional function is to be performed is identified in the packet detecting unit 21, the routing information modifying unit 20 overwrites the information in the identifier 101 added to the packet by the module number 302, the port number 303, and the next node IP address 304 obtained from the detecting condition table 22.

The IP packet selecting unit 14 judges whether or not the packet received via the lower bus 5 by the lower bus transceiver 19 is the IP packet.

The packet buffer 13 stores the packet received by the lower bus transceiver 19 or the upper bus transceiver 10.

The CPU 11 executes software stored in the memory 12. The software executes a management function of various devices in the routing module 2, a function of storing the setting information etc. transferred from the main processing module 1 into respective tables, and the like. Besides, the software executes a function of transmitting the packet other than the IP packet to the main processing module 1.

The memory 12 stores various pieces of software executed by the CPU 11. Besides, the memory 12 also stores the foregoing port management table 16, the routing table 18, and the detecting condition table 22. That is, the information contained in the respective tables is stored in the memory 12. Accordingly, each of the port management table lookup unit 15, the IP route table lookup unit 17, and the packet detecting unit 21 accesses the memory 12 to look up the information contained in the respective tables or to read out it.

The upper bus transceiver 10 performs handling of the packet transmitted or received via the upper bus 4. The upper bus transceiver 10 transmits the packet through the upper bus 4 in accordance with the module number 102 contained in the identifier 101 added to the head portion of the packet.

The extended function module 6 includes one or plural extended function processing modules 7, a distributing portion 8, a re-routing processing portion 27, and an upper bus transceiver 9. The extended function module 6 further includes a CPU and a memory. The CPU executes various pieces of software stored in the memory. The extended function processing module 7 has a function of performing the IP additional function processing for the packet, and is constituted by hardware, such as a CPU and a memory, and software executed by the hardware. An LSI for dedicatedly processing various IP additional function processings may be included. The distributing portion 8 has a function of distributing and transmitting the packet to the extended function processing module 7. The re-routing processing portion 27 includes the same structures as the IP route table lookup unit 17, the routing table 18, and the routing information modifying unit 20 of the routing module 2. Similarly to the IP route table lookup unit 17 and the routing information modifying unit 20, the re-routing processing portion has a function of acquiring the transmission route information of the IP packet and a function of modifying the identifier 101. Incidentally, the routing table of the re-routing processing portion 27 is stored in the memory included in the extended function module 6. The upper bus transceiver 9 has the same structure and function as the upper bus transceiver 10 of the routing module 2.

Next, a description will be given of a processing procedure of the packet routing apparatus in which an IP packet is received from some port 23, an IP additional function processing is performed for the IP packet by the extended function module 6, and the IP packet is again transmitted to some port 23.

Figure 7:
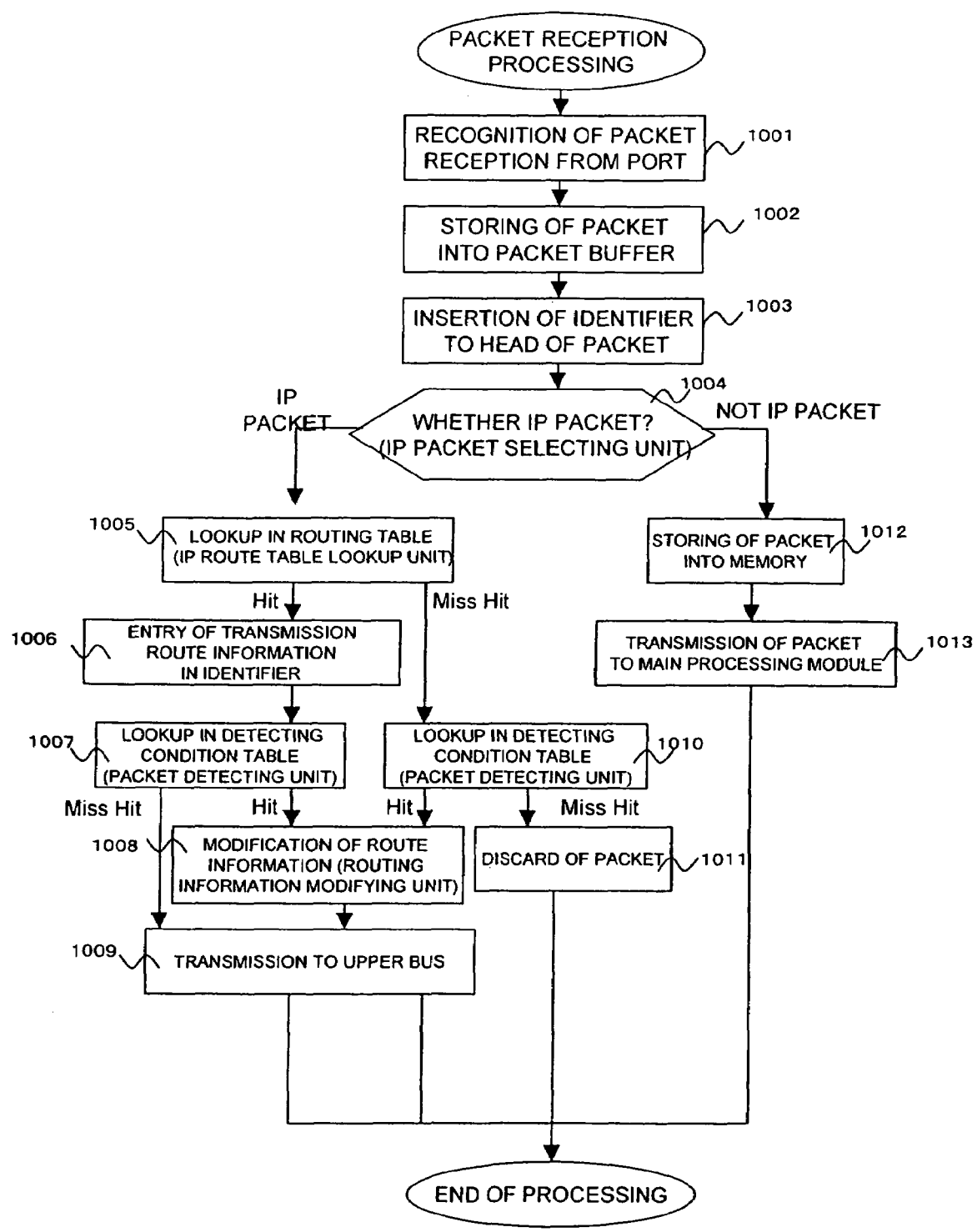
FIG. 7 is a flowchart showing a packet processing procedure in a reception side routing module.

FIG. 7 is a flowchart showing a packet processing procedure in a reception side routing module. First, a procedure in which the IP packet is transmitted from the reception side routing module 2 to the extended function module 6 will be described with reference to this flowchart.

The port control module (1)3 recognizes the packet reception from one port 23 (step 1001). The port control module (1)3 transmits the received packet to the lower bus 5. The lower bus transceiver 19 of the routing module (1)2 receives the received packet from the lower bus 5, and stores it into the packet buffer 13 (step 1002). At this time, the lower bus transceiver 19 adds the identifier 101 to the head portion of the packet and stores it into the packet buffer 13 (step 1003). The IP packet selecting unit 14 judges whether or not the packet stored in the packet buffer 13 is the IP packet (step 1004). In the case where the packet is the IP packet, the IP route table lookup unit 17 performs lookup in the routing table 18 (step 1005). In this lookup, the IP packet route lookup unit 17 uses the subnet mask 202 stored in one entry of the routing table 18 and extracts the network address portion from the destination IP address contained in the IP header of the IP packet. Besides, the IP packet route lookup unit 17 uses the subnet mask 202 and extracts the network address portion from the destination IP address 201 of the entry. For example, setting of the subnet mask 202 determines which range of bits of the IP address is used as the network address portion. For that purpose, the subnet mask 202 is used, and part or all of the bits of the destination IP address are obtained and are compared. The IP packet route lookup unit 17 compares values of the two extracted network address portions and judges whether both are coincident with each other. The IP packet route lookup unit 17 performs this judgment for the respective entries of the routing table 18, and when finding the entry in which the values of the two network address portions are coincident with each other (when the lookup is hit), the IP packet route lookup unit reads out the transmission route information (the module number 203, the port number 204, and the next node IP address 205) from the entry.

The routing information modifying unit 20 stores the read out values of the module number 203, the port number 204 and the next node IP address 205 into the respective fields of the identifier 101 added to the IP packet (step 1006).

Next, the packet detecting unit 21 performs lookup in the detecting condition 301 of the detecting condition table 22 by the IP address contained in the IP packet or information of a protocol of a further upper layer (step 1007). In the case where the detecting condition 301 coincident with the information contained in the IP packet is found (lookup is hit), the packet detecting unit 21 identifies the IP packet as the packet for which the IP additional function processing is to be performed, and reads out the module number 302 of the extended function module 6 for performing the processing, the port number 303, and the next node IP address 304 from the entry in which the coincidental detecting condition 301 is stored.

The routing information modifying unit 20 stores the module number 302, the port number 303 and the next node IP address 304 read out from the detecting condition table 22 by the packet detecting unit 21 into the respective fields of the identifier 101 by overwriting (step 1008). In the case where the lookup at the step 1007 is not hit, the packet detecting unit 21 terminates the processing. Since the information such as the module number 302 is not read out by the packet detecting unit 21, the routing information modifying unit 20 does not perform any processing at this point of time.

After the above processing is performed, the upper bus transceiver 10 transmits the IP packet stored in the packet buffer 13 to the extended function module 6 of the transmission destination through the upper bus 4 in accordance with the module number 102 of the identifier 101 added to the packet (step 1009).

In the case where the lookup at the step 1005 is not hit, the IP route table lookup unit 17 terminates the processing. In this case, since the transmission route information is not read out by the IP route table lookup unit 17, the routing information modifying unit 20 does not perform any processing at this point of time.

Next, the packet detecting unit 21 performs lookup in the detecting condition table 22 similarly to the step 1007 (step 1010). In the case where this lookup is hit, similarly to the step 1007, the packet detecting unit 21 reads out the transmission route information such as the module number 302 from the detecting condition table 22. In this case, the routing information modifying unit 20 executes the step 1008, and stores the values read out by the packet detecting unit 21 into the respective fields of the identifier 101. In the case where the lookup at the step 1010 is not hit, the packet detecting unit 21 terminates the processing. In this case, the routing module (1)2 discards the packet stored in the packet buffer 13 (step 1011) and terminates the reception processing.

At the step 1004, in the case where the IP packet selecting unit 14 judges that the packet is not the IP packet, the IP packet selecting unit 14 stores the packet into the memory 12 managed by the CPU 11 (step 1012). The software executed by the CPU 11 transmits the packet to the main processing module 1 through the upper bus transceiver 10 and the upper bus 4 (step 1013). When receiving the packet, the main processing module 1 identifies the kind of the packet and executes the processing corresponding to the kind. If the packet is the packet that needs to be routed, the main processing module 1 performs the routing processing. From the above processing procedure, the reception side routing module 2 can transmit the IP packet for which the IP additional function processing is to be performed to the extended function module 6.

Figure 8:
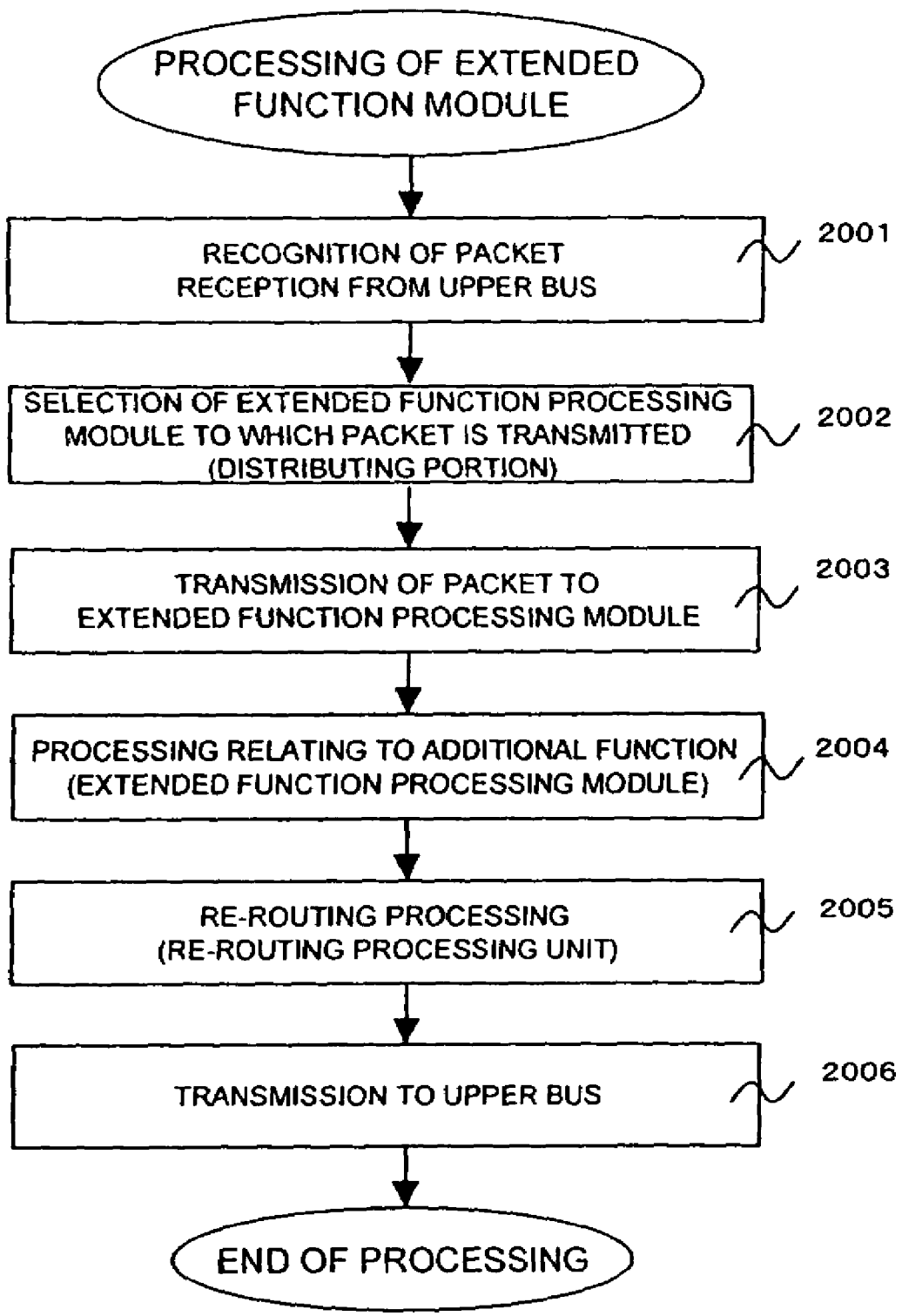
FIG. 8 is a flowchart showing a packet processing procedure in an extended function module.

Next, a processing procedure in the extended function module 6 will be described with reference to FIG. 8. FIG. 8 is a flowchart showing a packet processing procedure in the extended function module.

The IP packet transmitted from the routing module 2 to the extended function module 6 is received from the upper bus 4 by the upper bus transceiver 9 of the extended function module 6. The upper bus transceiver 9 refers to the module number 102 of the identifier 101 added to the IP packet, and recognizes that the IP packet directed to its own module is received (step 2001). In the case where the extended function module 6 includes the plurality of extended function processing modules 7, the distributing portion 8 uses the port number 103 and the next node IP address 104 contained in the identifier 101 of the IP packet and selects one of the extended function processing modules 7 (step 2002). The distributing portion 8 transmits the packet to the selected extended function processing module 7 (step 2003). As stated above, the processing can be distributed to the plurality of extended function processing modules 7 by the values of the port number 303 and the next node IP address 304 made to correspond to the detecting condition 301 and stored in the detecting condition table 22 of the reception side routing module 2.

The selected extended function processing module 7 receives the IP packet and executes the processing in relation to the IP additional function (step 2004). When completing the processing, the extended function processing module 7 transmits the IP packet to the re-routing processing portion 27.

The re-routing processing portion 27 performs a similar processing to that of the step 1005 performed by the IP route table lookup unit 17 of the routing module 2, acquires transmission route information from the destination IP address of the IP packet, and stores the value into the identifier 101 of the IP packet by overwriting (step 2005).

The upper bus transceiver 9 transmits the IP packet processed by the re-routing processing portion 27 to the upper bus 4 (step 2006).

Here, a specific example of the processing in relation to the IP additional function by the extended function processing module 7 will be described.

Figure 9:
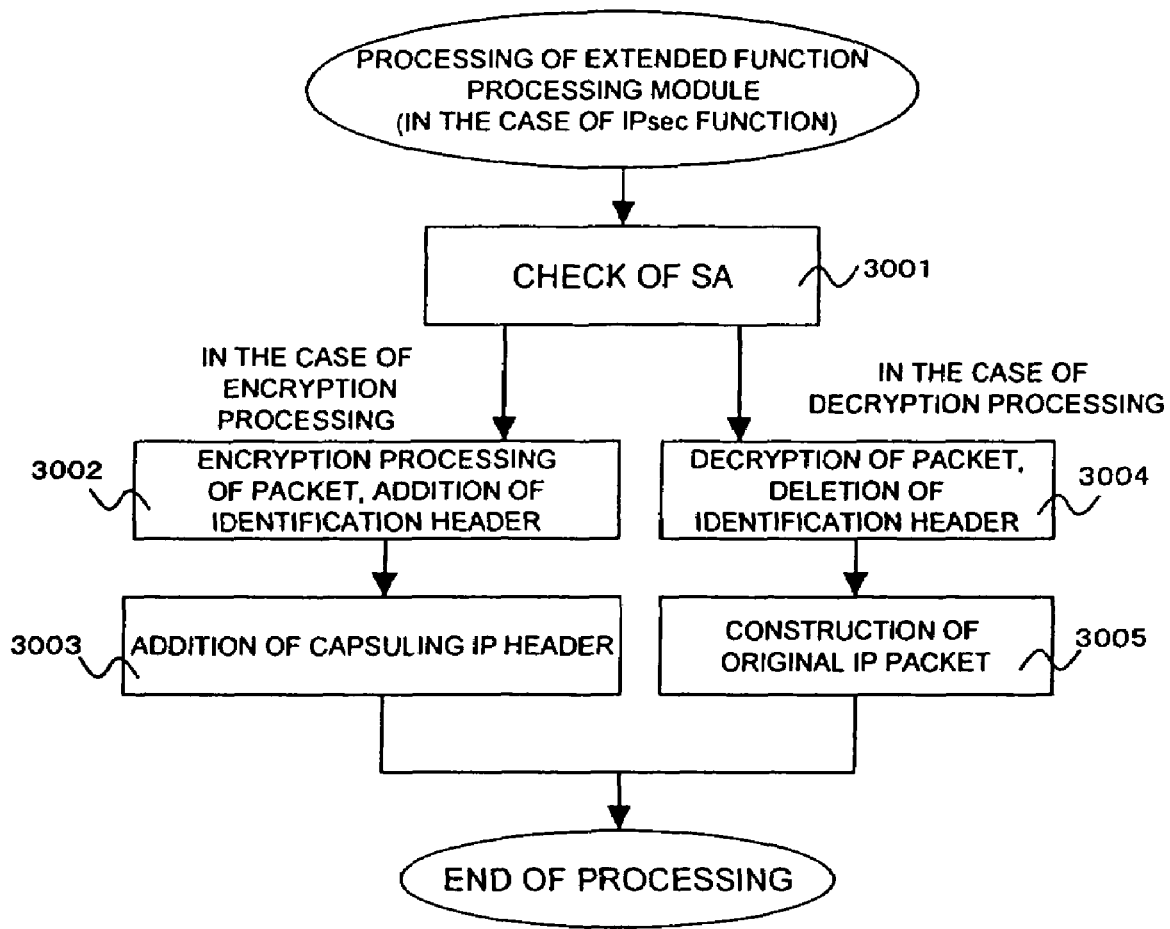
FIG. 9 is a flowchart showing a packet processing procedure in an extended function processing module with an IPsec function as an example.

FIG. 9 is a flowchart showing the packet processing procedure in the extended function processing module with an IPsec function as an example. In this example, the extended function processing module 7 executes the IPsec function of a tunneling mode.

When receiving the IP packet from the distributing unit 8, the extended function processing module 7 performs a check of SA (Security Association) by the destination IP address of the IP packet (step 3001). By this check, the extended function processing module 7 can judge whether encryption is to be performed to the IP packet or decryption is to be performed. Besides, the extended function processing module 7 can obtain the kind of encryption algorithm and an encryption key used for encryption or decryption. In the case where encryption is performed, the extended function processing module 7 executes a processing such as encryption of the IP packet and addition of an identification header to the IP packet (step 3002). Then, the extended function processing module 7 adds a new IP header (capsuling IP header) to the head portion of the IP packet to generate a new IP packet (step 3003). In the case where decryption is performed, the extended function processing module 7 uses the encryption key obtained by the SA check (step 3001), and performs the decryption of the encrypted IP packet, identification, and deletion of the identification header (step 3004). Thereafter, the IP header added to the head portion of the IP packet is deleted, and the IP packet before the encryption is again generated (step 3005). The extended function processing module 7 performs the above processing and transmits the IP packet to the re-routing processing portion 27.

Figure 10:
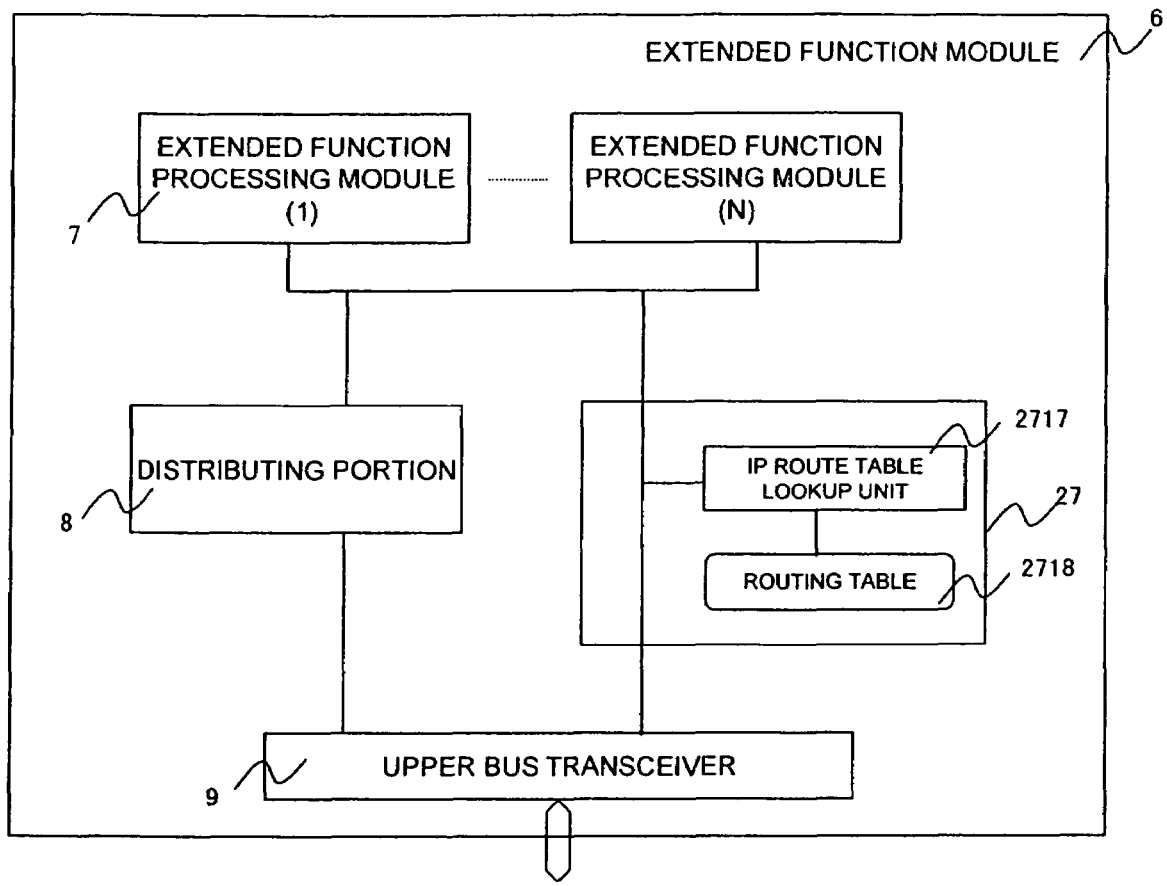
FIG. 10 is a structural view showing the details of an extended function module 6.

FIG. 10 is a structural view of the extended function module 6, showing the structure of the re-routing processing portion 27. As described above, the re-routing processing unit 27 includes an IP route table lookup unit 2717 and a routing table 2718. Although not shown, the re-routing processing unit 27 also includes a routing information modifying unit. By these structures, the re-routing processing unit 27 again looks up transmission route information from the destination IP address contained in the IP packet after the IP additional function processing is performed. By this processing, the IP packet transmitted to the extended function module 6 can be again transmitted to the transmission side routing module 2. Even in the case where the IP additional function of the extended function processing module 7 changes the IP header contained in the IP packet as in the IPsec function, the IP packet can be correctly transmitted by the processing procedure of the foregoing extended function module 6.

Figure 11:
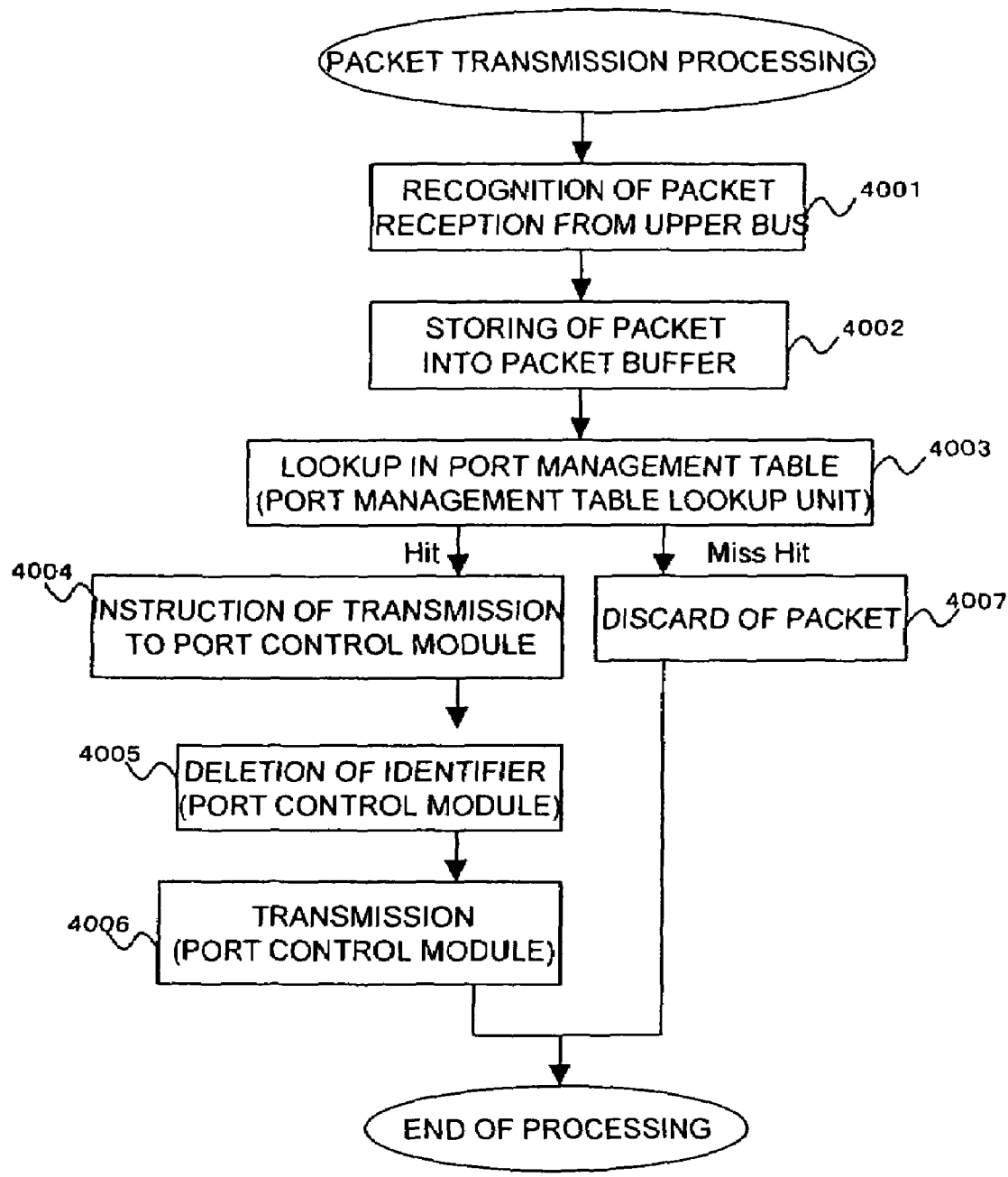
FIG. 11 is a flowchart showing a packet processing procedure in a transmission side routing module.

FIG. 11 is a flowchart showing a packet processing procedure in the transmission side routing module. A procedure in which the transmission side routing module (N)2 transmits the IP packet transmitted from the extended function module 6 to the transmission destination port 23, will be described with reference to this flowchart.

The IP packet transmitted to the upper bus 4 from the extended function module 6 is received by the upper bus transceiver 10 of the transmission side routing module (N)2. The upper bus transceiver 10 refers to the module number 102 of the identifier 101 added to the IP packet, and recognizes that the IP packet directed to its own module is received (step 4001). The upper bus transceiver 10 stores the IP packet in the packet buffer 13 (step 4002). The port management table lookup unit 15 uses the port number 103 contained in the identifier 101 of the IP packet as a lookup key and performs lookup in the port management table 16 (step 4003). When finding an entry in which the port number 401 coincident with the lookup key is registered (when the lookup is hit), the port management table lookup unit 15 reads out, from the entry, the physical port number 402 of the port for transmission of the IP packet. The lower transceiver 19 identifies the port 23 corresponding to the read out physical port number 402, and instructs the port control module (N)3 for controlling the port 23 to transmit the IP packet (step 4004). Besides, the lower bus transceiver 19 extracts the IP packet from the packet buffer 13 and transmits it to the lower bus 5. The instructed port control module (N)3 receives the IP packet from the lower bus 5, and deletes the identifier 101 added to the IP packet (step 4005). Then, the port control module (N)3 transmits the IP packet to the instructed port 23 (step 4006).

In the case where the lookup at the step 4003 is not hit, the port management table lookup unit 15 terminates the processing. Then, the transmission side routing module (N)2 discards the IP packet stored in the packet buffer 13 (step 4007), and terminates the transmission processing.

Next, a description will be given of another example in a case where the content of the identifier 101 added to the IP packet is changed.

According to the processing procedure of the reception side routing module 2 explained by the use of FIG. 7, first, the transmission route information obtained by the IP route table lookup unit 17 is stored in the respective fields of the identifier 101 by the routing information modifying unit 20. This transmission route information corresponds to the transmission side routing module 2. Thereafter, in the case where the lookup by the packet detecting unit 21 is hit, the information such as the module number 302 obtained by the packet detecting unit 21 is overwritten in the respective fields of the identifier 101 by the routing information modifying unit 20. The information here corresponds to the extended function module 6. As stated above, the information corresponding to the transmission side routing module 2 is overwritten by the information corresponding to the extended function module 6 and is erased. Accordingly, in the case where the IP packet is transmitted from the extended function module 6 to the transmission side routing module 2, the re-routing processing unit 27 must perform the same lookup as the IP route table lookup unit 17 to obtain the transmission route information.

Figure 12:
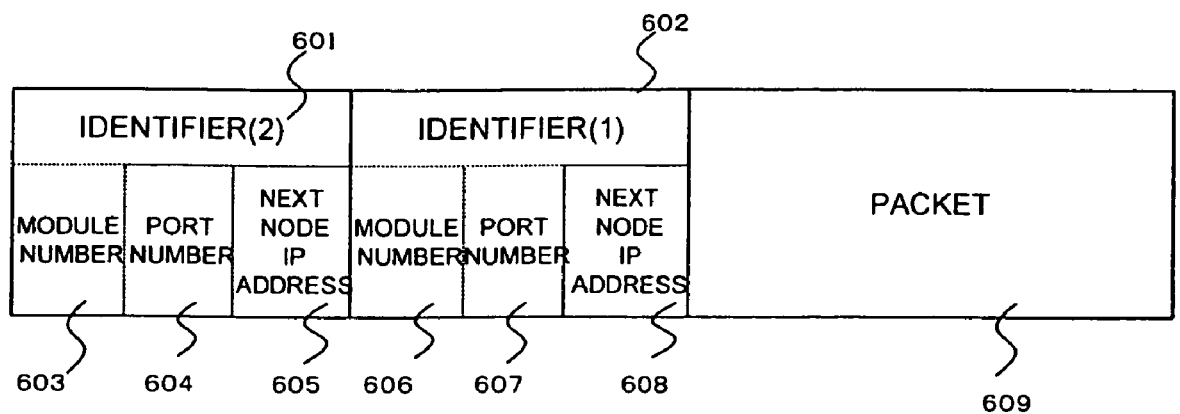
FIG. 12 is a view showing another example of an identifier insertion format to a packet.

FIG. 12 shows another example of an identifier insertion format to a packet. In this example, as shown in the drawing, an identifier (1)602 and an identifier (2)601 are doubly added to a packet 609. In the case where it is necessary to change the information of the first added identifier, as shown in FIG. 12, if a new identifier is merely added to the former identifier, the information of the first added identifier is not lost.

A processing procedure of an identifier by the reception side routing module 2 in this case will be described.

As described by the use of FIG. 7, when the lookup at the step 1005 is hit, the IP route table lookup unit 17 of the reception side routing module 2 reads out the transmission route information from the routing table 18. The routing information modifying unit 20 stores the transmission route information into the respective fields of the module number 606, the port number 607, and the next node IP address 608 of the identifier (1)602 already added to the packet. Next, in the case where the lookup at the step 1007 by the packet detecting unit 21 is hit, the packet detecting unit 21 reads out the module number 302, the port number 303, and the next node IP address 304 from the detecting condition table 22. The routing information modifying unit 20 adds the new identifier (2)601 in which the information read out from the detecting condition table 22 is stored in the respective fields of the module number 603, the port number 604, and the next IP address 605, in front of the identifier (1)602. The upper bus transceiver 10 transmits the packet in accordance with the module number 603 contained in the most leading identifier (2)601 of the packet.

By the above procedure, while the information of the first added identifier remains, the reception side routing module 2 can transmit the packet to the extended function module 6.

Next, a processing procedure of the extended function module 6 in the above case will also be described.

The upper bus transceiver 9 of the extended function module 6 refers to the module number 603 contained in the most leading identifier (2)601 of the packet, and recognizes that the packet directed to its own module is received. Thereafter, the packet is processed by the extended function processing module 7 and is transmitted to the re-routing processing unit 27. In this case, as shown in FIG. 12, the identifier (1)602 and the identifier (2)601 are added to the packet. When receiving the packet from the extended function processing module 7, the re-routing processing unit 27 merely deletes the identifier (2)601 added to the most leading portion of the packet. By this, the packet comes to have only the identifier (1)602. The upper bus transceiver 9 transmits the packet in accordance with the module number 606 contained in the identifier (1)602.

As described above, the transmission route information corresponding to the transmission side routing module 2 is stored in the identifier (1)602. Thus, the re-routing processing unit 27 does not need to look up the transmission route information. Besides, the extended function module 6 can transmit the packet to the transmission side routing module.

In the above case, the packet is transmitted from the extended function module 6 to the transmission side routing module 2 in accordance with the transmission route information obtained by the reception side routing module 2. Thus, the above processing by the reception side routing module 2 is effective in the case where the IP address contained in the packet is not changed by the processing of the extended function module 6.

Incidentally, the positions where the respective identifiers are added to the packet may be arbitrary positions. The upper bus transceivers 9 and 10 can recognize the transmission destination of the packet by using the identifier of an arbitrary position. Besides, the number of identifiers added to the packet may be three or more. For example, in the case where a plurality of IP additional functions are executed for the packet by the plurality of extended function modules 6, identifiers corresponding to the respective extended function modules 6 are added to the packet. Besides, a system called source routing in which transmission route information to the plurality of modules of transmission destinations is determined by the IP route lookup unit 17 of the reception side routing module 2, can also be applied to the foregoing processing procedure.

Next, another structural example of a packet routing apparatus will be described.

Figure 13:
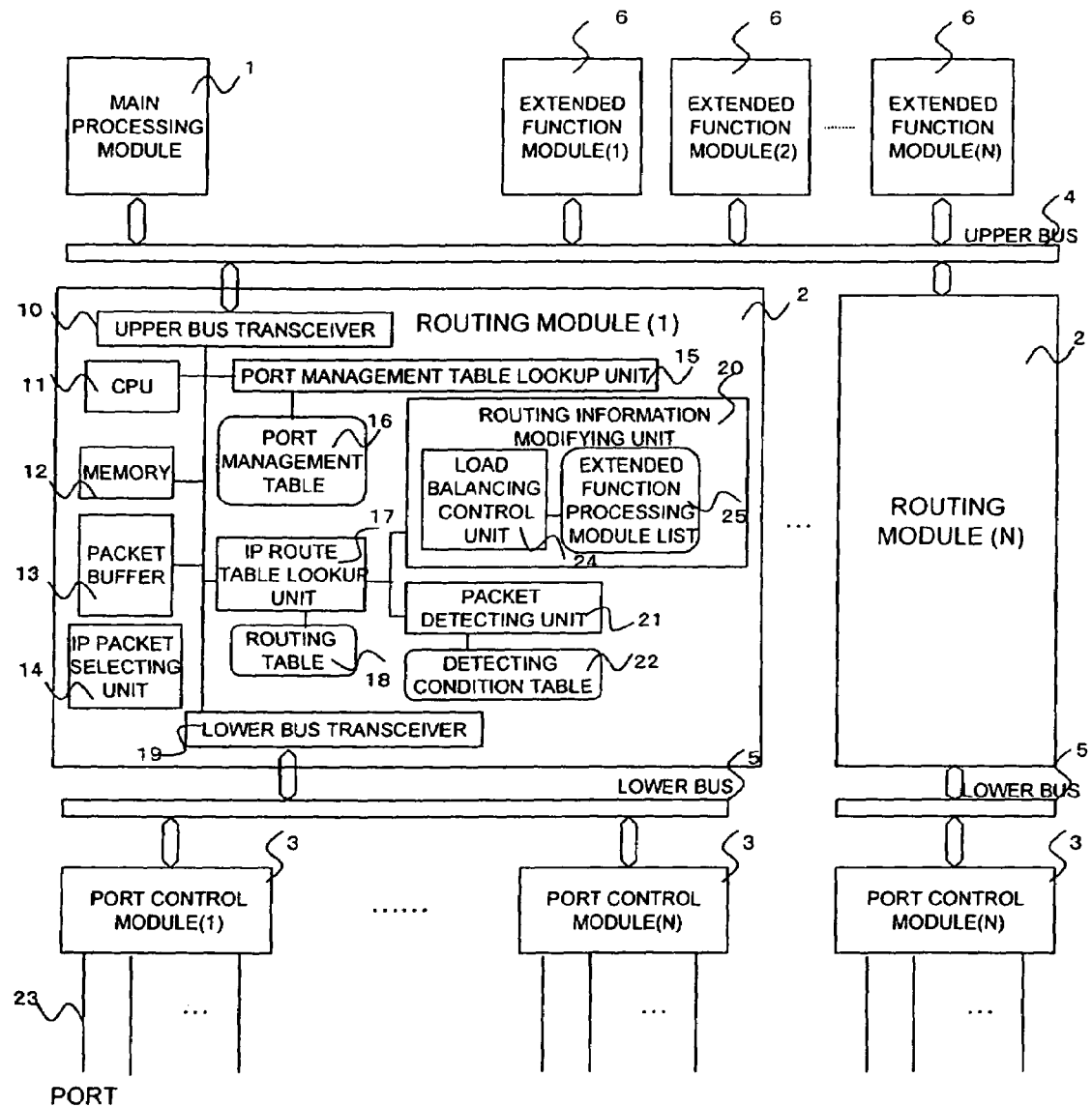
FIG. 13 is another structural view of a packet routing apparatus.

FIG. 13 is another structural view of a packet routing apparatus.

The packet routing apparatus shown in FIG. 2 includes the one extended function module 6. Thus, in the case where a processing of an IP additional function is necessary for the received packet, the respective routing modules 2 transmit the packet to the extended function module 6.

On the other hand, the packet routing apparatus shown in FIG. 13 includes a plurality of extended function modules 6. The extended function modules 6 respectively execute the same IP additional function processing. Thus, this packet routing apparatus can distribute the packet needed to be subject to the IP additional function processing to the plurality of extended function modules 6 and can perform the processing.

Further, in the packet routing apparatus shown in FIG. 13, a routing information modifying unit 20 of each of routing modules 2 includes a load balancing control unit 24 and an extended function processing module list 25.

FIG. 14 shows a structural example of the extended function processing module list 25. As shown in the drawing, a module list number 501 and a module list 502 are made to correspond to each other and are stored in the extended function processing module list 25. The module list 502 includes N sets of transmission route information corresponding to the N modules. Each set of the transmission route information is constituted by a module number 503, a port number 504, and a next node IP address 505.

In the packet routing apparatus shown in FIG. 2, the detecting condition 301 and the transmission route information (the module number 302, the port number 303, and the next node IP address 304) corresponding to the one extended function module 6 are made to correspond to each other and are stored in the detecting condition table 22.

On the other hand, in the packet routing apparatus shown in FIG. 13, the value of the module list number 501 contained in the extended function processing module list 25 is stored in the field of the module number 302 of the detecting condition table 22. FIG. 15 shows a structural example of the detecting condition table 22 in this packet routing apparatus. In this example, the detecting condition 301 and the module number 302 are made to correspond to each other and are stored in the detecting condition table 22. The value of the module list number contained in the extended function processing module list 25 is stored in the field of the module number 302. The detecting condition table 22 does not include the port number and the next node IP address, differently from the structure of the detecting condition table 22 shown in FIG. 6. However, the detecting condition table 22 of the packet routing apparatus shown in FIG. 13 may have the same structure as detecting condition table 22 shown in FIG. 6. In this case, arbitrary values may be stored in the respective fields of the port number 303 and the next node IP address 304 of the detecting condition table 22.

The load balancing control unit 24 of the routing information modifying unit 20 refers to the extended function processing module list 25, and selects one set of transmission route information (the module number 503, the port number 504, and the next node IP address 505) by an arbitrary method from the module list 502 made to correspond to a certain module list number 501. The selection method includes, for example, a method by round robin, a method of correlation with reception and transmission ports, a method of correlation with an IP address, a method of correlation with a TOS field, a method of correlation with a flow, a method by hash calculation, and a method of counting a transmission data amount.

The processing procedure by the respective structures of the packet routing apparatus shown in FIG. 13 is substantially the same as the processing procedure of the packet routing apparatus shown in FIG. 2. However, as described above, the structure of the detecting condition table 22 of the routing module 2 shown in FIG. 13 and the structure of the routing information modifying unit 20 are different from those shown in FIG. 2. Thus, the processing procedure relating to those is different from the processing procedure shown in FIG. 7. Accordingly, the processing procedure different from the processing procedure shown in FIG. 7 will be described below. Since the other processing procedure is the same as that shown in FIG. 7, the description is omitted.

In the case where the reception side routing module (1)2 receives the IP packet, as shown in FIG. 7, the IP route table lookup unit 17 performs lookup in the routing table 18 (step 1005). When the lookup by the IP route table lookup unit 17 is terminated, next, the packet detecting unit 21 performs lookup in the detecting condition table 22 (step 1007 or step 1010). As shown in FIG. 15, values of the detection condition 301 and the module list number 501 are made to correspond to each other and are stored in the detecting condition table 22. Thus, in the case where the lookup at the step 1007 or the step 1010 is hit, the packet detecting unit 21 obtains the value of the module list number from the detecting condition table 22. The load balancing control unit 24 of the routing information modifying unit 20 uses the value of the module list number 501 obtained from the detecting condition table 22 and performs lookup in the extended function processing module list 25. The load balancing control unit 24 selects a set of transmission route information (the module number 503, the port number 504, and the next node IP address 505) by an arbitrary method from the module list 502 made to correspond to the value of the module list number 501 and reads out it from the extended function processing module list 25. Then, the load balancing control unit 24 stores the read out transmission route information into the respective fields of the identifier 101 by overwriting.

By the above processing procedure, the reception side routing module 2 can distribute and transmit one or more packets detected under the same detecting condition to the plurality of extended function modules 6.

Next, another structural example if the extended function module 6 will be described.

Figure 16:
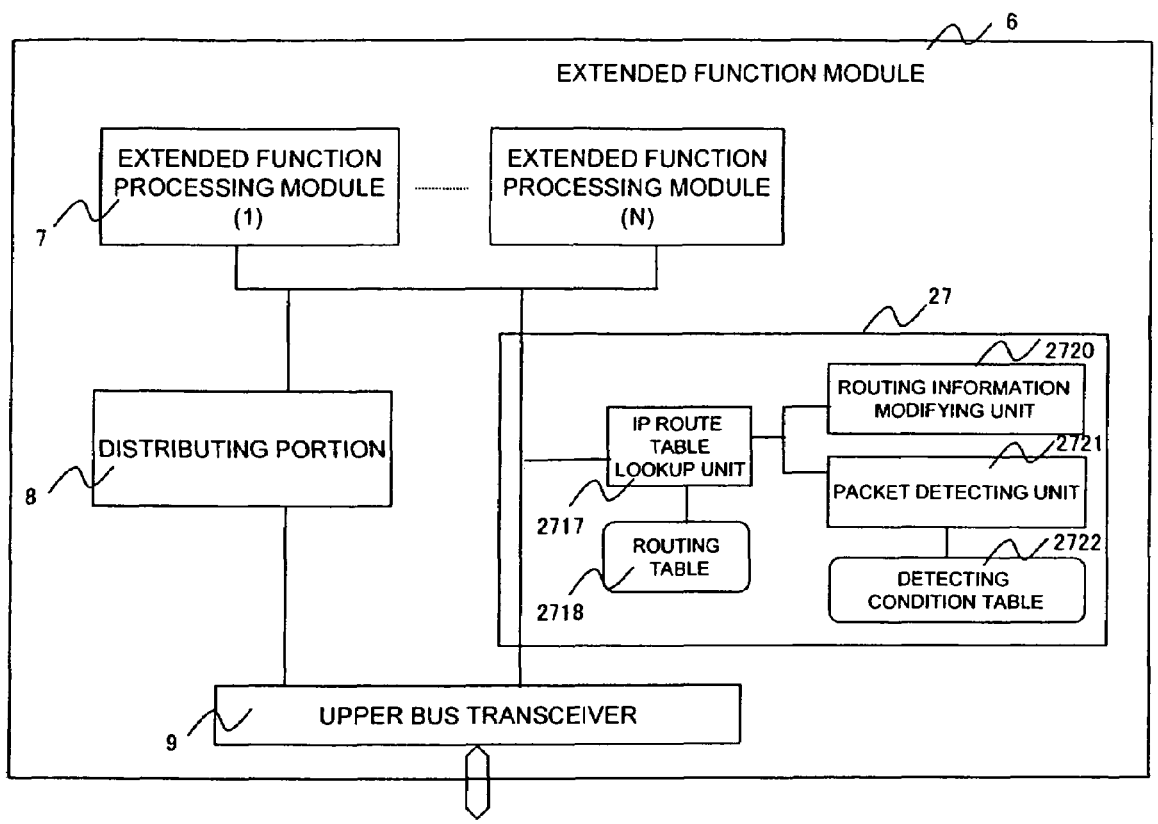
FIG. 16 is another structural view showing an extended function module 6.

FIG. 16 is another structural view of the extended function module 6. Similarly to the re-routing processing unit 27 shown in FIG. 10, a re-routing processing unit 27 of the extended function module 6 shown in FIG. 16 includes an IP route table lookup unit 2717, a routing table 2718, and a routing information modifying unit 2720. Further, the re-routing processing unit 27 includes a packet detecting unit 2721 and a detecting condition table 2722. Information contained in the detecting condition table 2722 is stored in a memory included in the extended function module 6.

The IP route table lookup unit 2717, the routing table 2718, the routing information modifying unit 2720, the packet detecting unit 2721, and the detecting condition table 2722 are respectively identical to the IP route table lookup unit 17, the routing table 18, the routing information modifying unit 20, the packet detecting unit 21, and the detecting condition table 22 shown in FIG. 2. With respect to these structures, since the re-routing processing unit 27 has the same structure as the routing module 2, the re-routing processing unit 27 can store the transmission route information corresponding to the other extended function module 6 into the identifier 101 of the packet. That is, the extended function module 6 including the re-routing processing unit 27 can transfer the packet to the other extended function module 6. Incidentally, the extended function module 6 to which the packet is transmitted from the extended function module 6 may be different from the extended function module 6 of the transmission side or may be the same.

By the above structure, in the case where a processing relating to two different IP additional functions (for example, a function A and a function B) is performed for one packet, for example, one extended function module 6 performs the processing relating to the function A, and the packet can be transmitted to the other extended function module 6 which performs the processing relating to the function B.

Next, another structural example of a packet routing apparatus will be described.

Figure 17:
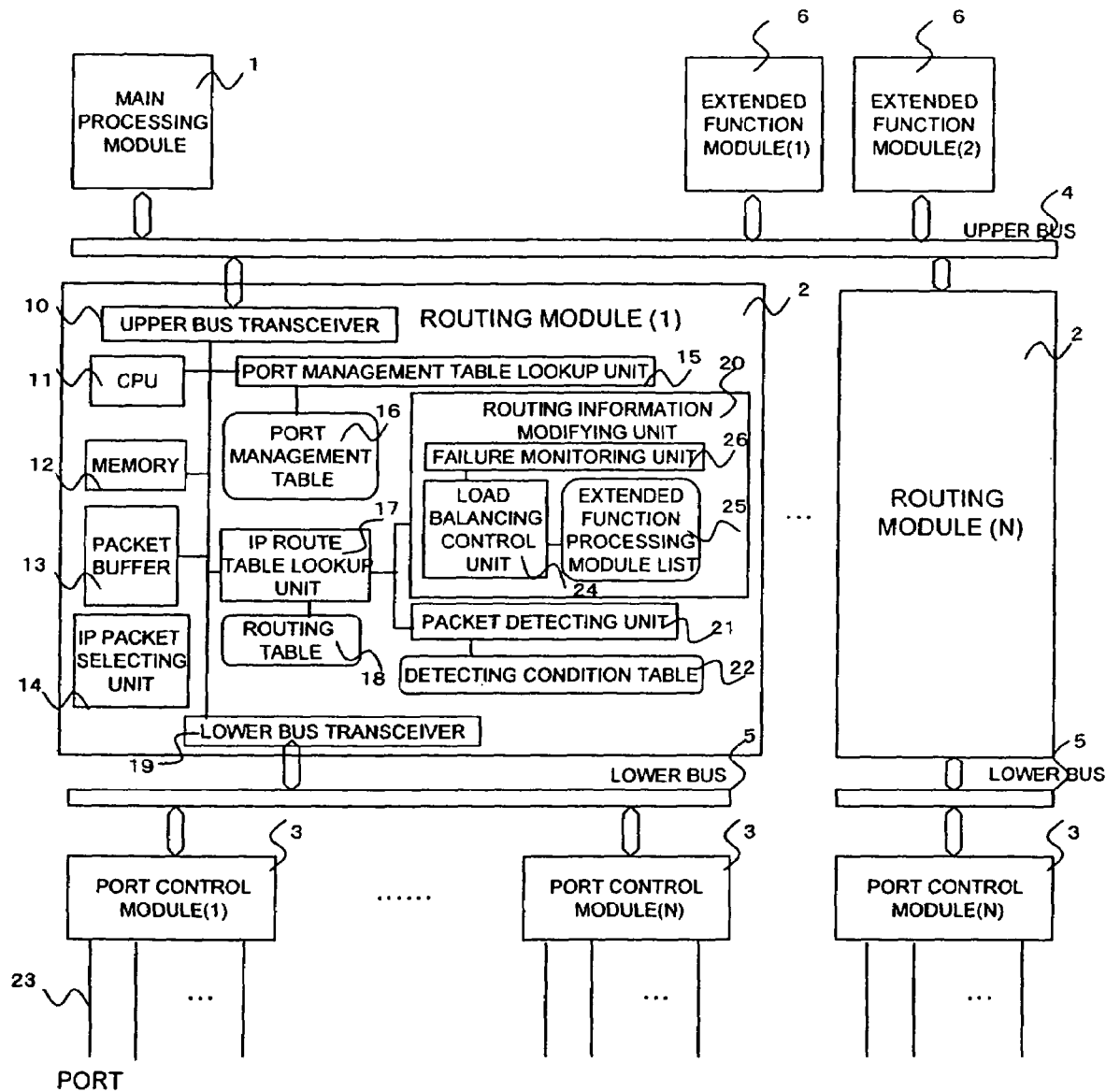
FIG. 17 is another structural view of a packet routing apparatus.

FIG. 17 shows another structural view of the packet routing apparatus. In FIG. 17, a route modifying unit 20 of the packet routing apparatus further includes a failure monitoring unit 26.

The failure monitoring unit 26 monitors the operation state of the respective extended function modules 6 at a constant period. In the case where it is detected that a failure occurs in some extended function module 6, the failure monitoring unit 26 temporarily deletes the transmission route information corresponding to the extended function module 6 having the detected failure from the module list 502 stored in the extended function processing module list 25. Besides, in the case where it is detected that the extended function module 6 is restored from the failure, the transmission route information relating to the extended function module 6 is registered in the module list 502 of the extended function processing module list 25.

By the above operation of the failure monitoring unit 26, only the transmission route information relating to the operational extended function modules 6 is stored in the module list 502 of the extended function processing module list 25. Accordingly, even in the case where one or more extended function modules 6 fail, the reception side routing module 2 can transmit the packet to one or more normal extended function modules 6.

As described above, the packet routing apparatus can transmit the IP packet from the routing module to the extended function module by the same processing procedure as the routing processing of the IP packet. Thus, the packet routing apparatus can transmit the IP packet to the extended function module at substantially the same speed as the routing of the IP packet, and the IP additional function processing to the IP packet can be executed at high speed.

What is claimed is:

1. A packet routing apparatus, connected to a plurality of ports, for transmitting a packet received from one of the ports to the other port, comprising:
    at least one routing module for routing the packet received from one of the ports to the other port;
    at least one extended function module for receiving the packet transmitted from one of the routing modules, performing an arbitrary additional function processing, and transmitting the packet to which the arbitrary additional function processing was performed to one of the routing modules; and
    a bus for mutually connecting the respective routing module and the extended function module respectively;
    wherein the routing module comprises:
    an adding portion for adding an identifier to a head portion of the received packet,
    a first lookup unit for looking up and acquiring first transmission route information corresponding to a port of a transmission destination by using address information contained in the received packet, and storing the first transmission route information into the identifier, and
    a bus transceiver for transmitting the packet added with the identifier to the bus, and receiving the packet from the bus,
    wherein the routing module transmits the packet to which the identifier was added to the extended function module, and
    wherein the extended function module transmits the packet to one of the routing modules according to information contained in the identifier, when the extended function module receives the packet to which the identification was added.

2. A packet routing apparatus according to claim 1, wherein the routing module further comprises a second lookup unit for identifying whether the received packet from one of the ports is to be transmitted to the extended function module, by using the information contained in the packet, and transmitting the packet to the extended function module where the packet is to be transmitted.

3. A packet routing apparatus according to claim 2, wherein the second lookup unit includes a second storage portion for storing previously determined detecting conditions and the second transmission route information corresponding to the extended function module, which are made to correspond to each other, and performs lookup in the second storage portion by using the predetermined information contained in the received packet, wherein, in a case where the detecting condition coincident with the predetermined information is stored in the second storage portion, the second lookup unit reads out the second transmission route information made to correspond to the detecting condition from the second storage portion.

4. A packet routing apparatus according to claim 3, wherein the second storage portion stores the respective detecting conditions and the plural second transmission route information corresponding to the plural extended function modules, which are made to correspond to each other; and
    in a case where the detecting condition coincident with the predetermined information is stored in the second storage portion, the second lookup unit selects an arbitrary one of the plural second transmission route information made to correspond to the detection condition and reads out it from the second storage portion.

5. A packet routing apparatus according to claim 1, wherein the routing module further comprises:
a second lookup unit for looking up and acquiring second transmission route information corresponding to the extended function module, and rewriting the first transmission route information of the identifier to the second transmission route information where the packet is to be transmitted to the extended function module.

6. A packet routing apparatus according to claim 1, wherein the first lookup unit includes a first storage portion for storing address information and the first transmission route information corresponding to the respective ports, which are made to correspond to each other, and looks up the address information stored in the first storage portion by using the address information contained in the received packet, wherein, in a case where the address information coincident with the address information contained in the received packet is stored in the first storage portion, the first lookup unit reads out the first transmission route information made to correspond to the address information from the first storage portion.

7. A packet routing apparatus according to claim 1, wherein the extended function module comprises:
a packet transceiver for transmitting and receiving a packet to the bus;
one or plural executing units for performing the additional function processing for the packet;
a distributing portion for selecting one of the executing units and transmitting the packet received by the packet transceiver to the selected executing unit; and
a routing portion for receiving the packet from the executing unit, using the address information contained in the packet to look up and acquire third transmission route information corresponding to the port of the transmission destination, and storing the third transmission route information into the identifier added to the packet.

8. A packet routing apparatus, connected to a plurality of ports, for transmitting a packet received from one of the ports to the other port, comprising:
at least one routing module for routing the packet received from one of the ports to the other port;
at least one extended function module for receiving the packet transmitted from one of the routing modules, performing an Internet Protocol security (IPsec) processing, and transmitting the packet to which the IPsec processing was performed to one of the routing modules; and
a bus for mutually connecting the respective routing module and the extended function module respectively;
wherein the extended function module comprises:
a packet transceiver for transmitting and receiving a packet to the bus,
one or plural executing units for performing the IPsec processing for the packet, and
a distributing portion for selecting one of the executing units and transmitting the packet received by the packet transceiver to the selected executing unit,
wherein the routing module comprises:
an adding portion for adding an identifier to a head portion of the received packet,
a lookup unit for looking un and acquiring transmission route information corresponding to a port of a transmission destination by using address information contained in the received packet, and storing the transmission route information into the identifier, and
a bus transceiver for transmitting the packet added with the identifier to the bus, and receiving the packet from the bus,
wherein the routing module transmits the packet to which the identifier was added to the extended function module, and
wherein the extended function module transmits the packet to one of the routing modules according to information contained in the identifier, when the extended function module receives the packet to which the identification was added.

9. A packet routing apparatus, connected to a plurality of ports, for transmitting a packet received from one of the ports to the other port, comprising:
at least one routing module for routing the packet received from one of the ports to the other port;
at least one extended function module for receiving the packet transmitted from one of the routing modules, performing an Internet Protocol security (IPsec) processing, and transmitting the packet to which the IPsec processing was performed to one of the routing modules; and
a bus for mutually connecting the respective routing module and the extended function module respectively,
wherein the extended function module comprises:
a packet transceiver for transmitting and receiving a packet to the bus;
one or plural executing units for performing the IPsec processing for the packet; and
a distributing portion for selecting one of the executing units and transmitting the packet received by the packet transceiver to the selected executing unit,
wherein the executing unit judge whether encryption processing is to be performed or decryption processing is to be performed according to an address information, when the executing unit receives a packet from the distributing portion,
wherein the executing unit, where encryption processing is performed to the packet, executes encryption of the packet received from the distributing portion and addition of an identification header to the packet, and adds a new header to the head portion of the packet to generate a encrypted packet, and
wherein the packet transceiver transmits the encrypted packet to the bus.

10. A packet routing apparatus, connected to a plurality of ports, for transmitting a packet received from one of the ports to the other port, comprising:
at least one routing module for routing the packet received from one of the ports to the other port;
at least one extended function module for receiving the packet transmitted from one of the routing modules, performing an Internet Protocol security (IPsec) processing, and transmitting the packet to which the IPsec processing was performed to one of the routing modules; and
a bus for mutually connecting the respective routing module and the extended function module respectively,
wherein the extended function module comprises:
a packet transceiver for transmitting and receiving a packet to the bus;
one or plural executing units for performing the IPsec processing for the packet; and
a distributing portion for selecting one of the executing units and transmitting the packet received by the packet transceiver to the selected executing unit,
wherein the executing unit judge whether encryption processing is to be performed or decryption processing is to be performed according to an address information, when the executing unit receives a packet from the distributing portion, wherein the executing unit, where decryption processing is performed to the packet, executes decryption of the packet received from the distributing portion and deletion of an identification header of the packet, and deletes a header added to the head portion of the packet to generate a decrypted packet, and wherein the packet transceiver transmits the decrypted packet to the bus.

11. A routing method by a packet routing apparatus including at least one routing module connected to plural ports and routing a packet received from one of the ports to the other port, and at least one extended function module for receiving the packet transmitted from one of the routing modules, performing an arbitrary additional function processing, and transmitting the packet to which the arbitrary additional function processing was performed to one of the routing modules, the method comprising the steps of:

in the routing module:
adding an identifier to a head portion of the packet received from an arbitrary port;
acquiring first transmission route information corresponding to a port of a transmission destination by using address information contained in the received packet;
storing the acquired first transmission route information into the identifier; and
transmitting the packet added with the identifier to the bus, and receiving the packets from the bus, wherein the routing module transmits the packet to which the identifier was added to the extended function module, and wherein the extended function module transmits the packet to one of the routing modules according to information contained in the identifier, when the extended function module receives the packet to which the identification was added.

12. A packet routing method according to claim 11, further comprising the steps of:

identifying whether the received packet from one of the ports is to be transmitted to the extended function module, by using the information contained in the packet, and transmitting the packet to the extended function module where the packet is to be transmitted, by the routing module.

13. A routing method according to claim 11, further comprising the steps of:

looking up and acquiring second transmission route information corresponding to the extended function module, and rewriting the first transmission route information of the identifier to the second transmission route information where the packet is to be transmitted to the extended function module, by the routing module.

* * * * *